United States Patent
Wolfe, Jr. et al.

(10) Patent No.: US 11,793,168 B2
(45) Date of Patent: Oct. 24, 2023

(54) PET TOY HAVING TREAT RETENTION FEATURES

(71) Applicant: Starmark Pet Products, Inc., Hutto, TX (US)

(72) Inventors: Jerry J. Wolfe, Jr., Hutto, TX (US); Harold Keith Benson, Hutto, TX (US)

(73) Assignee: Starmark Pet Products, Inc., Hutto, TX (US)

( * ) Notice: Subject to any disclaimer, the term of this patent is extended or adjusted under 35 U.S.C. 154(b) by 119 days.

(21) Appl. No.: 17/337,660

(22) Filed: Jun. 3, 2021

(65) Prior Publication Data

US 2022/0386567 A1 Dec. 8, 2022

(51) Int. Cl.
*A01K 15/02* (2006.01)

(52) U.S. Cl.
CPC .................. *A01K 15/026* (2013.01)

(58) Field of Classification Search
CPC .... A01K 15/026; A01K 15/025; A01K 15/02; A01K 5/0114
See application file for complete search history.

(56) References Cited

U.S. PATENT DOCUMENTS

| | | |
|---|---|---|
| D225,907 S | 1/1973 | Row |
| D248,493 S | 7/1978 | Moncrief |
| D308,122 S | 5/1990 | Markham et al. |
| 5,865,146 A | 2/1999 | Markham |
| D428,946 S | 8/2000 | Boorstein |
| 7,096,826 B2 | 8/2006 | Markham |
| RE39,563 E | 4/2007 | Markham |
| 7,278,374 B2 | 10/2007 | Mann |
| 7,600,488 B2 | 10/2009 | Mann |
| 7,631,613 B2 | 12/2009 | Lescroart |
| 7,640,894 B2 | 1/2010 | Jager |
| 8,516,977 B2 | 8/2013 | Shatoff et al. |
| D700,346 S | 2/2014 | Palizzi et al. |
| D700,709 S | 3/2014 | Khodabakhshian |
| 8,746,182 B2 | 6/2014 | Anderson |

(Continued)

FOREIGN PATENT DOCUMENTS

| | | |
|---|---|---|
| CN | 202907602 U | 5/2013 |
| CN | 302506503 | 7/2013 |

(Continued)

OTHER PUBLICATIONS

European Patent Office, Office Action, Application No. 22175196.9-1105, dated Jul. 4, 2023, 6 pages.

*Primary Examiner* — Trinh T Nguyen
(74) *Attorney, Agent, or Firm* — Brian F. Russell

(57) ABSTRACT

A pet toy is configured for use with a pet treat having a body with a gap therein that communicates with a central opening in the pet treat. The pet toy includes a body having an exterior surface and a core portion that is radially asymmetric and a slot formed in the body about the core portion. The slot has the core portion as a base and includes a sidewall having a second surface feature configured to cooperate with a first surface feature of the pet treat to promote retention of the pet treat in the slot. In some embodiments, one of the first and second surface features is a boss and the other is a recess. In some embodiments, the first and second surface features are engaged by rotating the pet treat within the slot with respect to the body of the pet toy.

18 Claims, 10 Drawing Sheets

(56) References Cited

U.S. PATENT DOCUMENTS

| | | | |
|---|---|---|---|
| 8,919,290 | B2 | 12/2014 | Ottosson |
| D721,183 | S | 1/2015 | Mallory |
| 8,997,689 | B2 | 4/2015 | Ragonetti |
| D742,601 | S | 11/2015 | Holterhaus et al. |
| 9,596,829 | B2 | 3/2017 | Wolfe, Jr. et al. |
| 9,788,526 | B2 | 10/2017 | Mann |
| 9,901,075 | B2 | 2/2018 | Wolfe, Jr. et al. |
| D812,320 | S | 3/2018 | Stone |
| 9,999,199 | B1 | 6/2018 | Dadalto et al. |
| D833,026 | S | 11/2018 | Khodabakhshian |
| 10,154,652 | B2 | 12/2018 | Zhang et al. |
| 10,420,324 | B2 * | 9/2019 | Wilhelm .............. A63H 33/26 |
| 10,609,898 | B2 | 4/2020 | Simon et al. |
| 10,660,304 | B2 | 5/2020 | Huang et al. |
| 10,674,711 | B2 | 6/2020 | Hutton |
| D891,008 | S | 7/2020 | Zeng |
| 10,716,288 | B2 | 7/2020 | O'Donnell et al. |
| D895,824 | S | 9/2020 | Nelson |
| 10,905,098 | B2 | 2/2021 | Markham |
| 10,932,449 | B2 | 3/2021 | Axelrod et al. |
| 10,959,406 | B2 | 3/2021 | Campbell et al. |
| 10,959,407 | B2 | 3/2021 | Christensen |
| 10,973,207 | B1 | 4/2021 | Ettehadieh |
| 2009/0151643 | A1 | 6/2009 | Hodgins |
| 2009/0314221 | A1 | 12/2009 | Wang |
| 2013/0118417 | A1 | 5/2013 | Teconchuk et al. |
| 2014/0345532 | A1 * | 11/2014 | Valle .................. A01K 15/026 119/51.01 |
| 2016/0113243 | A1 * | 4/2016 | Mullin ................ A01K 5/00 119/709 |
| 2018/0000048 | A1 * | 1/2018 | Stone .................. A01K 15/025 |
| 2019/0344114 | A1 | 11/2019 | Tran et al. |

FOREIGN PATENT DOCUMENTS

| | | |
|---|---|---|
| CN | 203942914 U | 11/2014 |
| CN | 206498790 U | 9/2017 |
| CN | 304754572 | 7/2018 |
| CN | 207707017 U | 8/2018 |
| CN | 209218897 U | 8/2019 |
| CN | 209314587 U | 8/2019 |
| CN | 305674229 | 3/2020 |
| CN | 108450347 B | 10/2020 |
| CN | 211881653 U | 11/2020 |
| DE | 202017101610 U1 | 4/2017 |
| EM | 001148332-0001 | 6/2009 |
| EM | 002947135-0001 | 1/2016 |
| EM | 002947135-0002 | 1/2016 |
| EM | 002947135-0003 | 1/2016 |
| EM | 004373462-0001 | 9/2017 |
| GB | 2532578 A | 5/2016 |
| GB | 2553611 B | 4/2019 |
| KR | 101692140 B1 | 1/2017 |
| KR | 20180078383 A | 7/2018 |
| KR | 102039934 B1 | 11/2019 |
| KR | 102085365 B1 | 3/2020 |
| TW | 201136632 A | 11/2011 |
| TW | 641315 B | 11/2018 |
| TW | 589965 U | 2/2020 |
| WO | 2004043142 A1 | 5/2004 |
| WO | 2009039153 A1 | 3/2009 |
| WO | D076749 | 9/2011 |
| WO | 2020187833 A1 | 9/2020 |

* cited by examiner

US 11,793,168 B2

PET TOY HAVING TREAT RETENTION FEATURES

BACKGROUND OF THE INVENTION

The present disclosure relates to a pet toy and use of the pet toy to provide an edible treat for a pet.

A variety of pet toys have been designed, manufactured, and sold, often with the intent of encouraging pet interaction, mental stimulation, and/or play, while reducing or eliminating pet boredom and its associated destructive behaviors. For dogs, these destructive behaviors may include, for example, biting, gnawing or clawing furniture or other articles in the dog's environment, digging or otherwise seeking to escape confinement, and excessive barking.

Pet toys often seek to incentivize a pet's extended interaction with the pet toy by providing one or more edible items (e.g., pet treat(s), pet food, or the like) to the pet over a relatively long time interval. However, in practice, an extended interval of animal interaction with the toy may not be achieved for some pet toys, for example, because the pet toy dispenses the edible item(s) to the pet in too great a quantity or too rapidly or because the pet toy makes it too difficult for the pet to consume the edible item(s). In either case, the pet will become disinterested in the pet toy and consequently engage in an undesired and/or destructive behavior.

BRIEF SUMMARY

In at least one embodiment, an improved pet toy is configured for use with a pet treat having a body with a gap therein that communicates with a central opening in the pet treat. The pet toy includes a body having an exterior surface and a core portion that is radially asymmetric and a slot formed in the body about the core portion. The slot has the core portion as a base and includes a sidewall having a second surface feature configured to cooperate with a first surface feature of the pet treat to promote retention of the pet treat in the slot. In some embodiments, one of the first and second surface features is a boss and the other is a recess. In some embodiments, the first and second surface features are engaged by rotating the pet treat within the slot with respect to the body of the pet toy.

In some embodiments, a pet treat is configured for use with a pet toy having a slot partially defined by a sidewall. The pet treat includes an edible body having a first side and an opposing second side. The body has a gap therein that communicates with a central opening in the body. A first surface feature is disposed on the body and configured to cooperate with a second surface feature of the sidewall of the slot of the pet toy to promote retention of the pet treat in the slot of the pet toy.

In some embodiments, a method of using a pet toy includes providing a pet treat including an edible body having a first side and an opposing second side. The body has a gap therein that communicates with a central opening in the body and further includes a first surface feature disposed on the body. The method additionally includes providing a pet toy configured for use with the pet treat. The pet toy includes a body having an exterior surface and a core portion that is radially asymmetric. A slot is formed in the body of the pet toy about the core portion. The slot has the core portion as a base and includes a sidewall having a second surface feature configured to cooperate with the first surface feature of the pet treat to promote retention of the pet treat in the slot. The method additionally includes inserting the pet treat in the slot such that the core portion is received through the gap into the central opening and engaging the first surface feature on the pet treat with the second surface feature on the pet toy.

DETAILED DESCRIPTION

Figure 1:
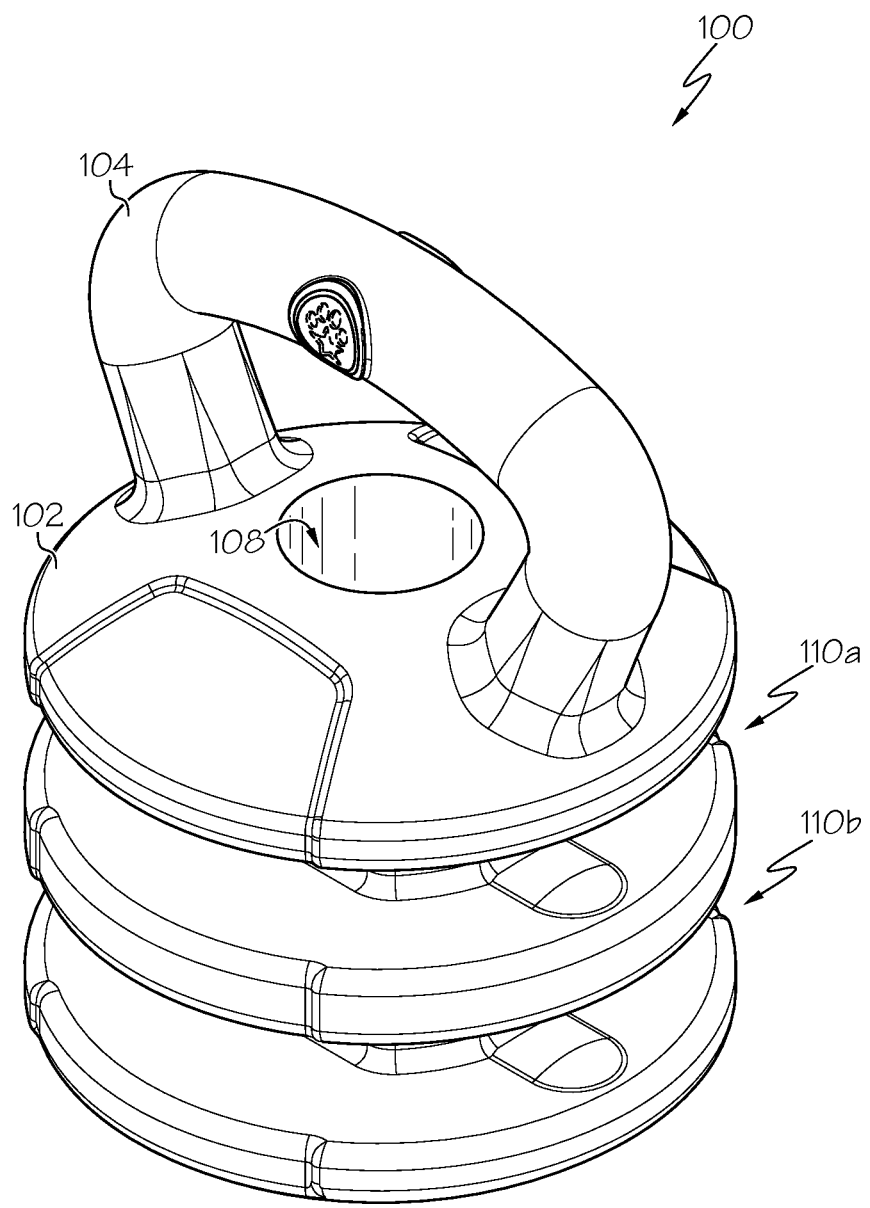
FIG. 1 is a perspective view of a pet toy in accordance with at least one embodiment.
Figure 2:
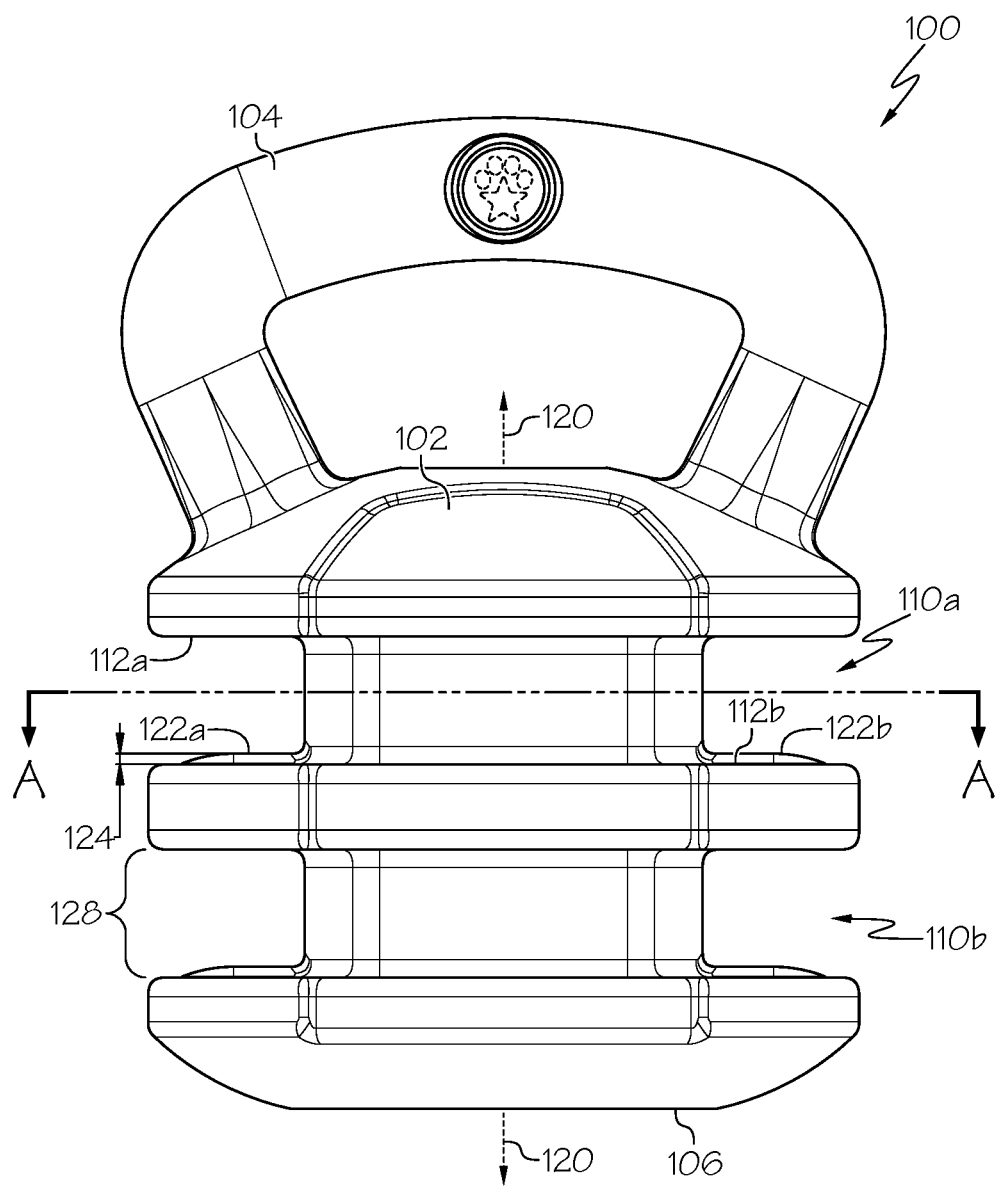
FIG. 2 is a front elevation view of a pet toy in accordance with at least one embodiment.
Figure 3:
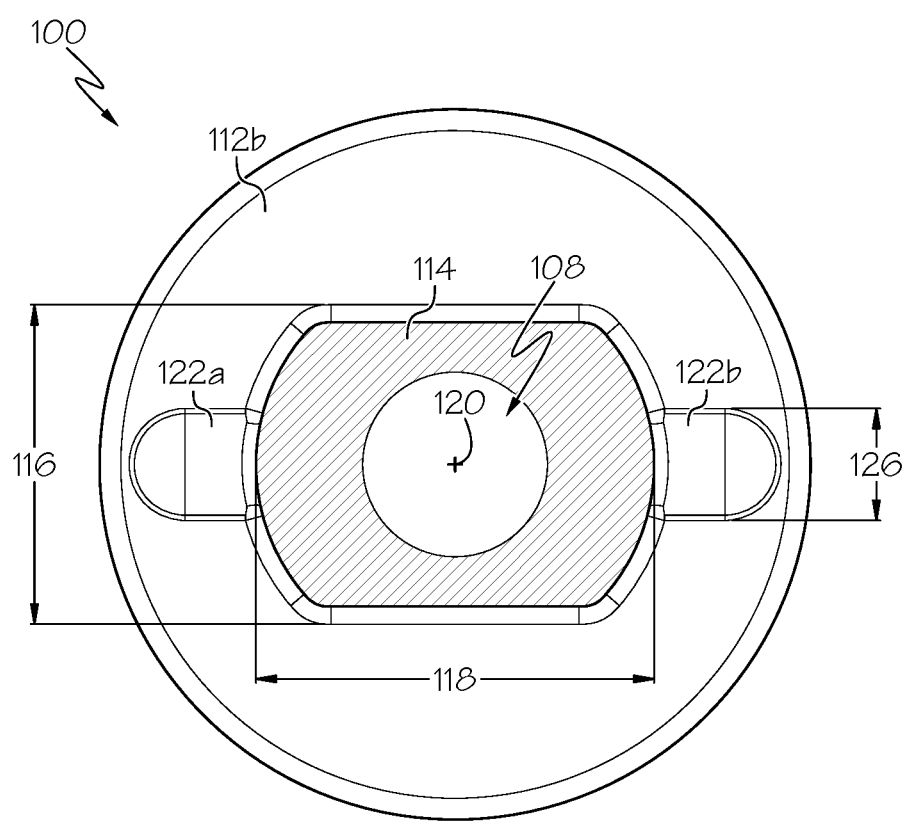
FIG. 3 is a section view of a pet toy in accordance with at least one embodiment.
Figure 4:
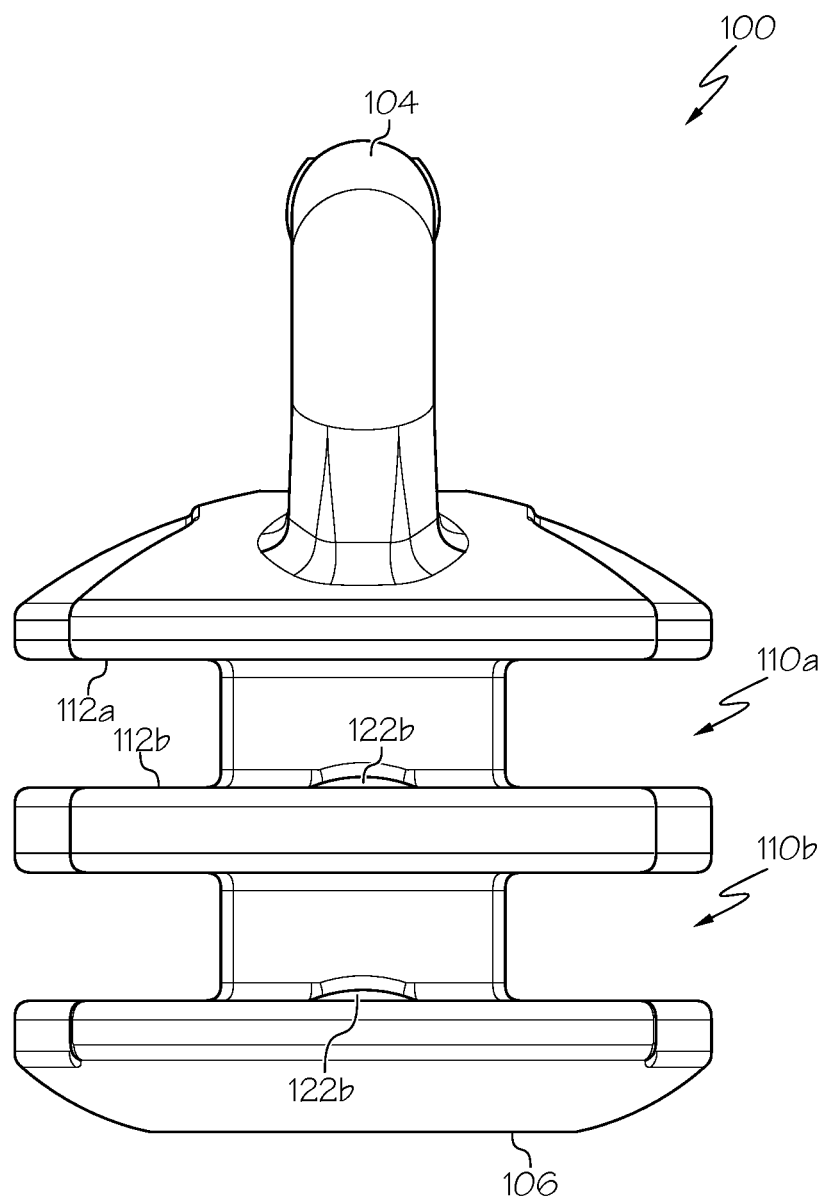
FIG. 4 is a side elevation view of a pet toy in accordance with at least one embodiment.
Figure 5:
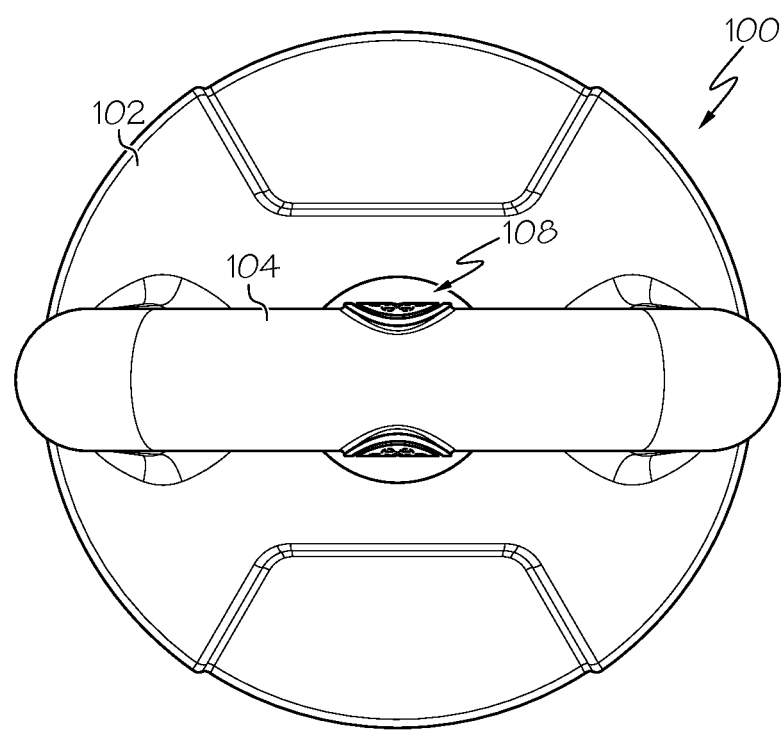
FIGS. 5-6 are top and bottom plan views, respectively, of a pet toy in accordance with at least one embodiment.
Figure 6:
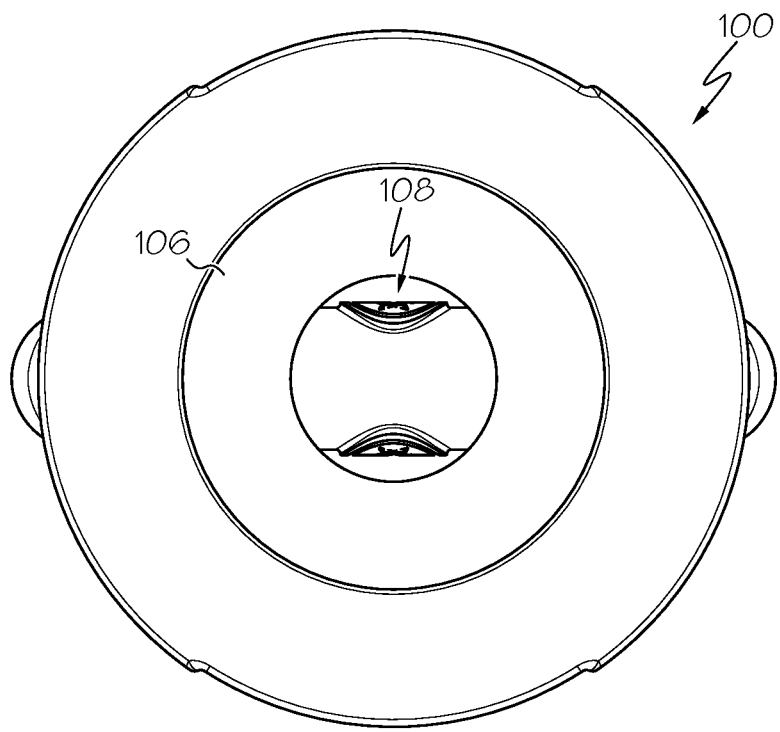

With reference now to the figures and with particular reference to FIGS. 1-6, there are illustrated a number of views of a pet toy 100 in accordance with at least one embodiment. In particular, FIG. 1 is a perspective view of pet toy 100; FIG. 2 is a front elevation view of pet toy 100; FIG. 3 is a section view of pet toy 100 taken along line A-A in FIG. 2; FIG. 4 is a side elevation view of pet toy 100 (the other side being substantially identical); FIG. 5 is a top plan view of pet toy 100; and FIG. 6 is a bottom plan view of pet toy 100.

As shown, pet toy 100 includes a body 102. Body 102 has an exterior surface, which in the various different embodiments can have different profiles and/or contours and/or surface finishes. Further, in various embodiments, body 102 of pet toy 100 can have any desired overall form, including, without limitation, that of a ball, a bone, a stick, an animal or human food item (e.g., a steak, a chicken leg, a donut, etc.), a geometric form (e.g., a sphere, a pyramid, a cube, a star, etc.), and/or an irregular form. Although not required in all embodiments, in some embodiments, at least a portion of body 102 may have a curved, ovoid, or rounded shape. For example, as best seen in FIGS. 1, 3, 5 and 6, at least a portion of body 102 can have a substantially circular cross-section when viewed in plan. In this example, pet toy 100 has the overall form of a simulated kettlebell and accordingly body 102 includes an optional handle portion 104, which in at least some embodiments is formed integrally with and of the same material as the remainder of body 102. The inclusion of handle portion 104 promotes various types of pet play, for example, a "tug-of-war" in which the pet grasps either body 102 or handle portion 104 in its jaws and a human handler grasps and pulls the other of body 102 or handle portion 104. Body 102 may also include a substantially planar surface 106 (best seen in FIGS. 2 and 6) that enables body to rest in a stable position on an underlying substrate (e.g., the floor or ground).

Although not required, body 102 (including handle portion 104) is preferably made of a resilient elastomeric material, such as a thermoplastic elastomer or natural rubber, which has sufficient durability to withstand the repeated biting action of an animal without tearing or permanent deformation. Body 102 can be made, for example, by injection molding. Although not required, body 102 can advantageously be formed with a hole 108 partially or fully there through. Hole 108 reduces the weight and cost of pet toy 100 and renders body 102 more pliable and easier for a pet to deform, thus promoting extended pet interaction with pet toy 100. Although not required, hole 108 can be located along a central axis 120 of body 102, as shown in FIGS. 1, 3, and 6.

The exterior surface of pet toy 100 preferably has at least one recess or slot 110 formed therein. In the example of FIGS. 1-6, body 102 of pet toy 100 has two slots 110a, 110b formed therein. If multiple slots 110 are included in a pet toy 100, the slots need not be identical and may instead having differing dimensions (e.g., widths, depths, lengths) and/or interior surfaces. In the example of FIGS. 1-6, each slot 110 has an opening at which the slot 110 communicates with the exterior surface of pet toy 100, a base formed by a core portion 114 of body 102 (which in this embodiment surrounds hole 108), and a pair of opposing sidewalls 112a, 112b extending between the base and the opening. In the illustrated embodiment, the opening of each slot 110 is fully circumferential with respect to body 102; in other embodiments, one or more of slots 110 may have an opening that extends less than all the way about body 102. Although not required in all embodiments, in the depicted embodiment, sidewalls 112a, 112b are substantially planar and approximately parallel.

In the embodiment of FIGS. 1-6 and as best seen in FIGS. 2-3, core portion 114 of body 102 is radially asymmetric in a plane formed by taking a section along line A-A orthogonal to axis 120 of body 102. Consequently, some regions of core portion 114 extend further from axis 120 of body 108 that other regions of core portion 114. For example, in some embodiments the ratio of a first dimension 116 of core portion 114 (i.e., a minimum dimension of core portion 114 measured through axis 120) to a second dimension 118 of core portion 114 (i.e., a maximum dimension of core portion 114 measured through axis 120) is between about 0.6 and about 0.8 and, more particularly, about 0.7.

As made clear in the following discussion, the sizes and shapes of slot 110 and core portion 114 are preferably selected to correspond to, and to accommodate within slot 110, an edible treat that can be utilized in combination with pet toy 100. As will be appreciated, the provision in a slot 110 of an edible treat that can be consumed by the pet increases a pet's interest in and engagement with a pet toy 100. Some prior art pet toys, exemplified by those disclosed in U.S. Pat. No. RE39563, rely on the resilience of the material from which the pet toys are formed and interference fit between pet treats and recesses formed in the pet toys in order to retain pet treats in the slots. However, the present application recognizes that often the retention force applied to the pet treats by such pet toys are frequently insufficient to retain the pet treats in the recesses for a long enough duration to achieve a desired period of engagement by the pet with the pet toy. For example, for some prior art pet toys, if a pet bites or chews on the pet toy even briefly, all of the pet treats fall out of the recesses onto the underlying substrate and are rapidly consumed by the pet. The pet consequently loses interest in the pet toy as soon as the pet treats are separated from the pet toy.

Pet toys in accordance with the embodiments disclosed herein address the issue of treat retention by providing one or more treat retention features that can extend a duration that a pet treat is retained in a slot 110. First, in at least some embodiments, the treat retention features include the relative dimensions of the pet treats and slots 110. In at least some embodiments, a width 128 of slot 110 and depth of slot 110 between the opening and core portion 114 are selected so that a pet will typically bite, gnaw, or lick on an edge of a treat, reducing the likelihood that the pet will rapidly remove the treat from the pet toy 100. Second, in at least some embodiments, the treat retention features include the radially asymmetric configuration of core portion 114 noted above. Because of this radially asymmetry, a pet treat installed in a slot 110 as discussed below will tend to be retained within the slot 110. Third, in at least some embodiments, the treat retention features including cooperating surface features on the pet treat and at least one sidewall 112. For example, as best seen in FIGS. 2-3, at least one of sidewalls 112a, 112b (in this case, only sidewall 112b) includes at least one boss 122 (and in this case, two bosses 122a, 122b) protruding from its generally planar surface into the interior of slot 110. Boss(es) 122 are designed to cooperate with substantially corresponding recess(es) formed in the surfaces of pet treats and thus promote retention of the pet treats within slots 110. Those skilled in the art will readily appreciate that the locations of the cooperating surface features can be reversed, for example, with the boss(es) implemented on the pet treats and the substantially corresponding recess(es) formed in sidewall(s) 112. In the exemplary embodiment shown in FIG. 3, each boss 122 has tapered edges and rises to a maximum extension 124 normal to the surrounding areas of sidewall 112 of between about 1 mm and about 2 mm. Each boss 122 may have a width 126 of between, for example, about 10 mm and about 20 mm.

Figure 7:
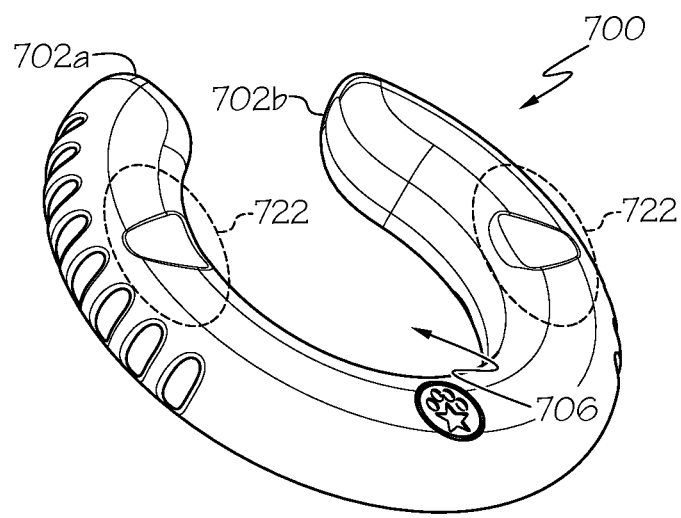
FIGS. 7-9 are perspective, elevation, and plan views, respectively, of a pet treat that may utilized in combination with a pet toy in accordance with at least one embodiment.
Figure 8:
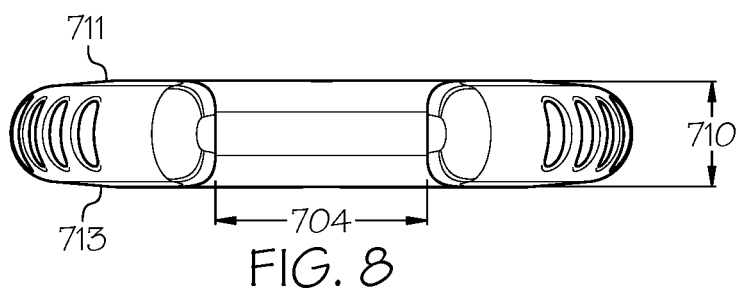
Figure 9:
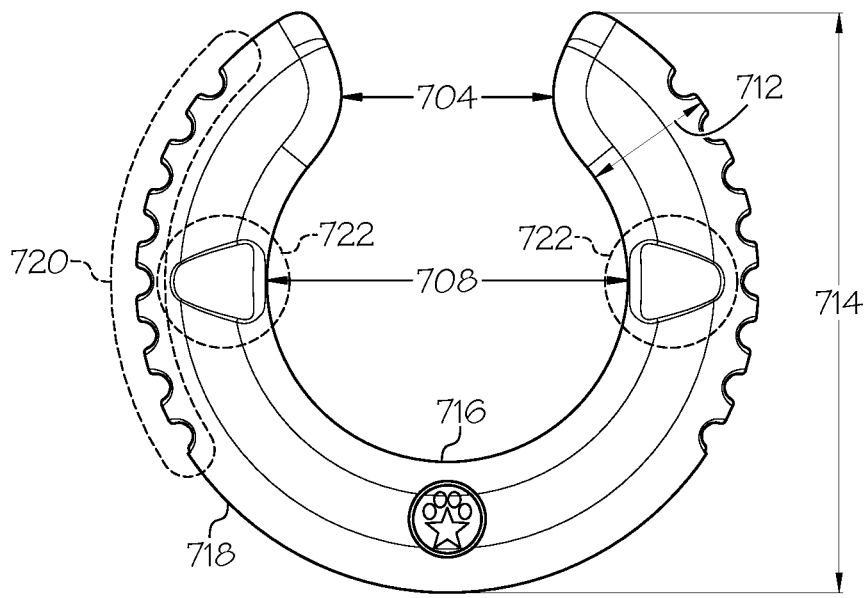

With reference now to FIGS. 7-9, there are illustrated perspective, elevation, and plan views, respectively, of a pet treat 700 that may utilized in combination with a pet toy 100 in accordance with at least one embodiment. In one or more embodiments, pet treats 700 can be rigid or semi-rigid and can be formed, for example, by injection molding as is known in the art. It is preferred if pet treats 700 are digestible by an animal and provide nutrition as well as a desirable flavor.

In the depicted example, pet treat 700 has a body having a generally horseshoe-shaped form, defined by a partial loop having two spaced-apart ends 702a, 702b separated by a gap 704. A minimum dimension of gap 704 is preferably selected such that first dimension 116 of core portion 114 can pass through gap 704 (either because the minimum dimension of gap 704 is equal to or greater than first dimension 116 or because elastic deformation of core portion 114 permits core portion 114 to pass through gap 704 even if first dimension 116 is greater than the minimum dimension of gap 704). The minimum dimension of gap 704 is further preferably selected such that second dimension 118 of core portion 114 cannot readily pass through gap 704 (e.g., because the minimum dimension of gap 704 is substantially less than the second dimension 118 of core portion 114). In the depicted example, the partial loop of pet treat 700 has a generally circular central opening 706 that communicates with gap 704. In this example, a diameter 708 of this central opening 706 is greater than second dimension 118 of core portion 114.

Figure 12:
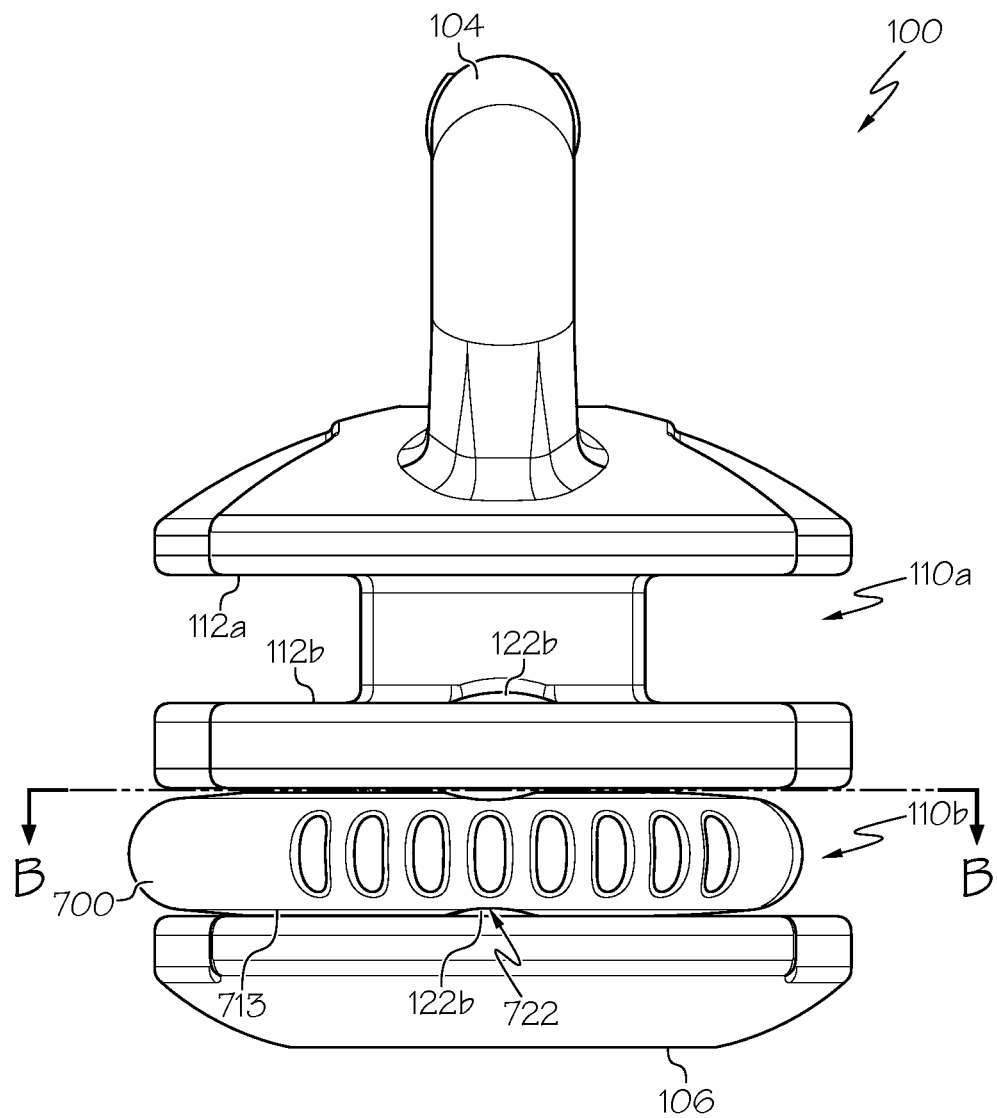

Pet treat 700 additionally has a thickness 710 measured orthogonally between substantially parallel first and second sides 711, 713 that is less than the width 128 at the opening of a slot 110. A minimum radial dimension 712 of pet treat 700 as measured radially between an interior edge 716 and an exterior edge 718 and a maximum dimension 714 of pet treat 700 are preferably selected to achieve a desired relationship between exterior edge 718 and the opening of a slot 110. In some cases, minimum radial dimension 712 and maximum dimension 714 are chosen such that exterior edge 718 of pet treat 700 is within a slot 110 when the pet treat 700 is installed in the slot 110. In other cases, minimum radial dimension 712 and maximum dimension 714 are chosen such that at least exterior edge 718 of pet treat 700 extends outwardly from a slot 110 past the opening of the slot 110 when pet treat 700 is installed in the slot 110. In yet other cases, minimum radial dimension 712 and maximum dimension 714 are chosen such that at least exterior edge 718 of pet treat 700 installed in a slot 110 is approximately at the opening of the slot 110, as shown in FIG. 12. In some embodiments, pet treat 700 includes grip enhancement features, such as bumps, ridges, and/or notches 720, formed in or on at least a portion of exterior edge 718 of pet treat 700.

As noted above, pet treat 700 preferably includes surface features that in cooperation with surface features of sidewalls 112a and/or 112b form treat retention features. For example, when pet treat 700 is configured for use with a pet toy 100 having at least one boss 122 formed on the sidewall of a slot 110, pet treat 700 preferably includes at least one recess 722 formed in at least one of first side 711 and second side 713. In the depicted example, pet treat 722 includes, in each of first side 711 and second side 713, two recesses 722 on opposing sides of central opening 706 and corresponding in spacing and location to bosses 122a, 122b.

It should be appreciated that the number, location, and size of recesses 722 may be varied from the depicted example. For example, a pet treat 700 may have only one or more than two recesses formed in a given side 711 or 713. Also, pet treat 700 may have the recess(es) formed in only one of sides 711 or 713. In this case, the pet treat 700 would have increased probability of retention within a slot 110 if the pet treat 700 is installed in a slot 110 with the recess(es) 722 engaging boss(es) 122 and a lesser probability of retention within the slot 110 otherwise. Further, the depths of recesses 722, which can be utilized to control the retention force applied to pet treat 700 by pet toy 100, can vary between different pet treats 700, between the different sides 711 and 713 of a given pet treat 700, and between recesses 722 on a given side 711 or 713 of a given pet treat 722.

Figure 10:
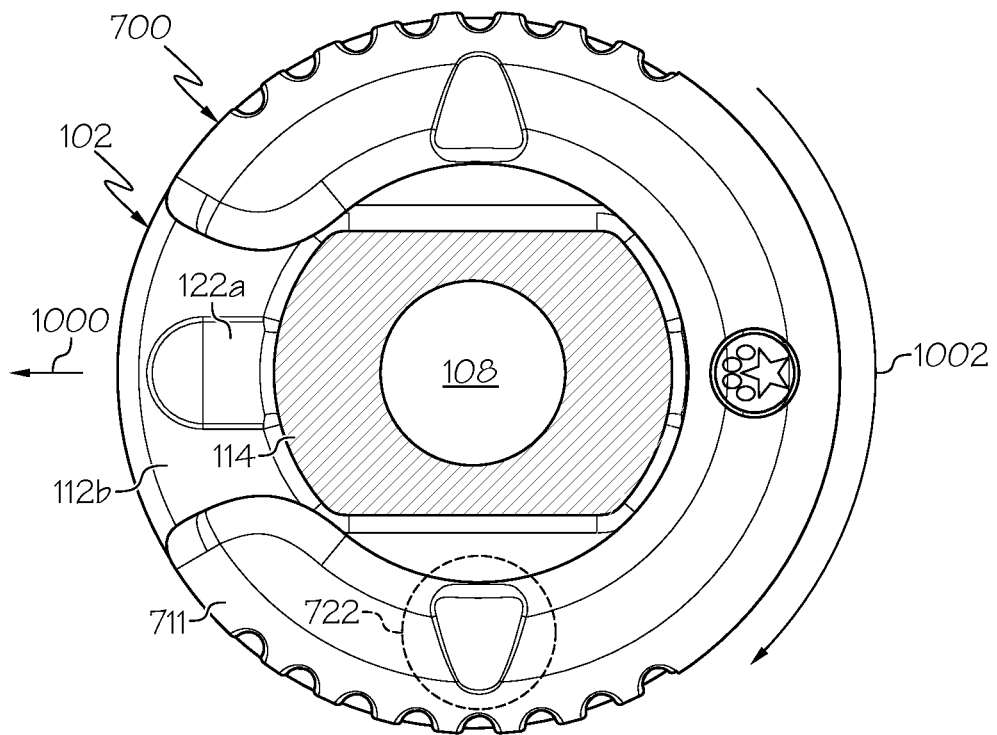
FIGS. 10-12 are section views and a side elevation view illustrating the installation of a pet treat in a pet toy in accordance with at least one embodiment.
Figure 11:
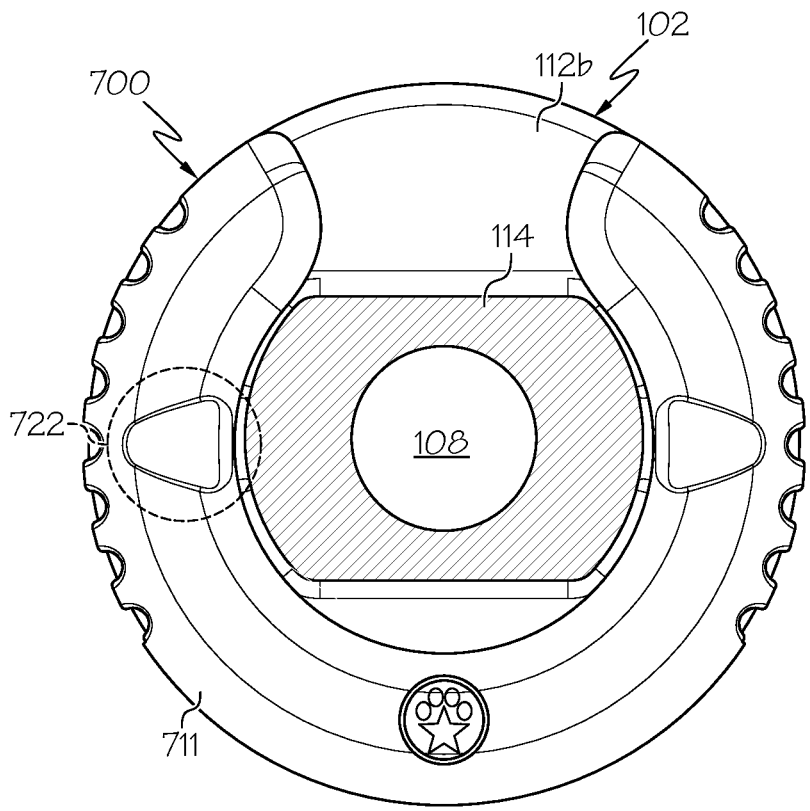

Referring now to FIGS. 10-12, there are depicted two section views taken along line B-B of FIG. 12 and a right side elevation view illustrating the installation of a pet treat 700 in a pet toy 100 in accordance with at least one embodiment.

In use, a pet treat 700 is installed into a slot 110 of a pet toy 100 by a human user as follows. First, the human user first translates pet treat 700 along a first linear direction indicated by arrow 1000 to cause core portion 114 of body 102 to pass through gap 704 into central opening 706 of pet treat 700, thus inserting pet treat 700 within slot 110. It should be noted in the initial treat insertion position shown in FIG. 10, recesses 722 on second side 713 of pet treat 700 do not engage bosses 122a, 122b on sidewall 112b of slot 110b.

Second, the human user rotates or twists pet treat 700 with respect to body 102 of pet toy 100 to cause a boss 122 (e.g., formed on a sidewall 112 of slot 110) to engage a cooperating recess 722 (e.g., formed in side 711 or 713 of pet treat 700). In the depicted example, the human user rotates pet treat 700 90 degrees clockwise with respect to body 102 of pet toy 100, as indicated by arrow 1002, in order to obtain the orientation illustrated in FIGS. 11-12. In this orientation, bosses 112 engage recesses 722. Of course, in the depicted embodiment, the human user could alternatively engage bosses 122 with cooperating recesses 722 by rotating pet treat 700 90 degrees counter-clockwise with respect to body 102 of pet toy 100. As best seen in FIG. 12, with boss 122b engaged with the concave surface of cooperating recess 722, pet treat 700 has improved resistance to removal from slot 110b, thus encouraging extended pet interaction with pet toy 100.

Those skilled in the art will appreciate that in other embodiments, cooperating surface features may alternatively or additionally be disposed on or formed in one or more of sidewalls 112a, 112b at radial positions other than 90 degrees with respect to the initial insertion position. For example, a cooperating surface feature may be located on a sidewall 112a or 112b at a lesser or greater angle than 90 degrees from the initial insertion position.

After the desired treat(s) 700 are loaded into pet toy 100, the human user can provide pet toy 100 to an animal to interact with. The animal will then attempt, via chewing, biting, licking to dislodge and/or to consume treat(s) 700. Once all treat(s) 700 are removed from slot(s) 110 by the animal, the animal can continue to interact with pet toy 100. Pet toy 100 may thereafter be reloaded with additional treats 700 as desired.

Figure 13:
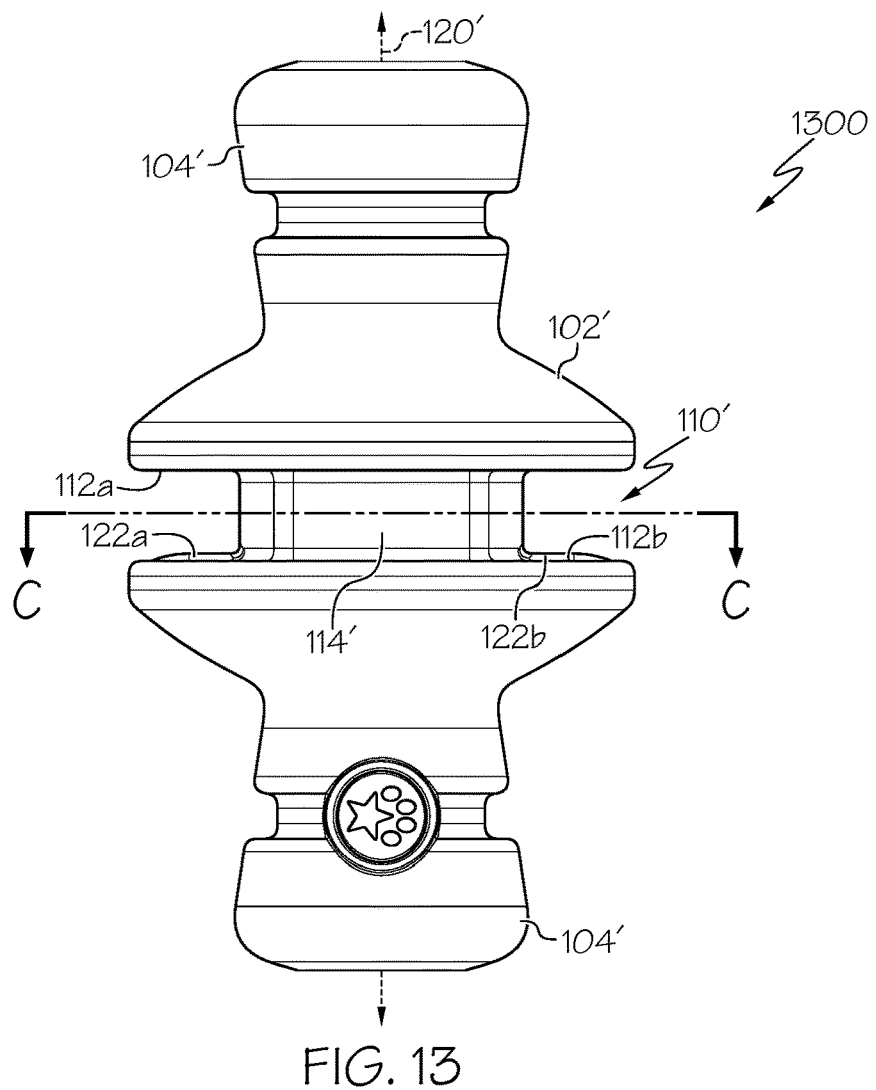
FIGS. 13-14 are front elevation and section views of another embodiment of a pet toy with which a pet treat can be utilized.
Figure 14:
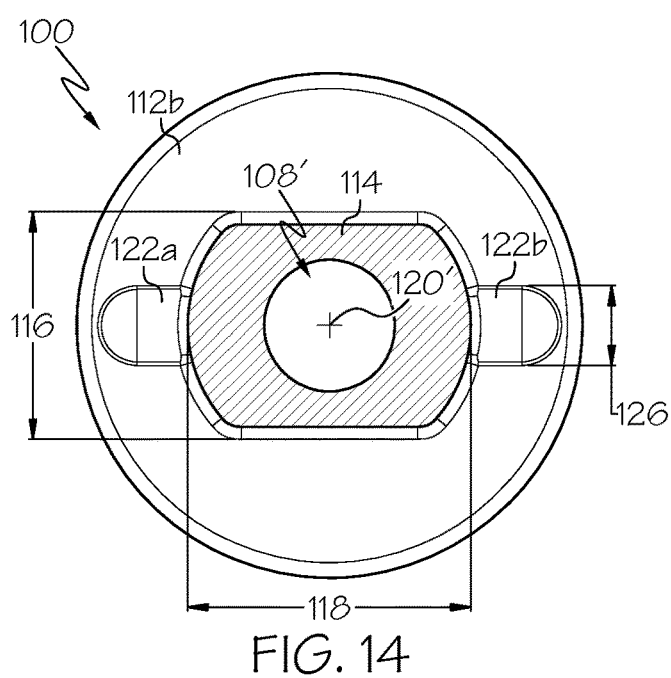

With reference now to FIGS. 13-14, there are illustrated front elevation and section views of another embodiment of a pet toy 1300 with which a pet treat 700 can be utilized. As discussed above with respect to pet toy 100, pet toy 1300 is preferably made of a resilient elastomeric material, such as a thermoplastic elastomer or natural rubber and can be formed by injection molding.

As indicated by prime notation, pet toy 1300 includes many features that, although possibly differing in configuration and/or number, correspond to those of pet toy 100. For example, pet toy 1300 includes a body 102' having two handle portions 104' on opposing sides of body 102'. Body 102' includes a hole 108', which in this embodiment is formed fully through body 102' and is centered on a central axis 120' of body 102.

Figure 15:
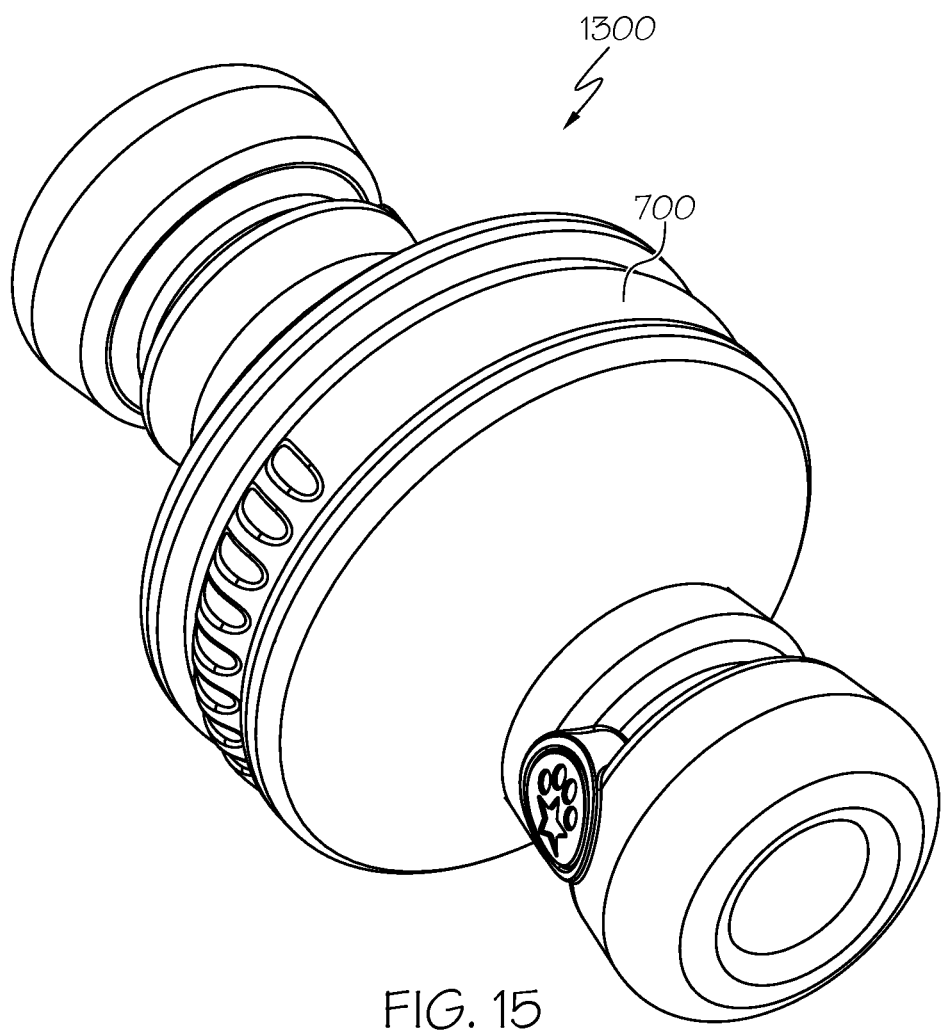
FIG. 15 depicts a perspective view of the installation of a pet treat in the pet toy of FIGS. 13-14.

The exterior surface of pet toy 1300 has a single slot 110' formed therein. As indicated by like reference numerals, the features of slot 110' can be implemented as described above with respect to slots 110a, 110b of pet toy 100. As shown in FIG. 15, a pet treat 700 can be installed in slot 110' of pet toy 1300 substantially as described above with reference to FIGS. 10-12.

As has been described, in one or more embodiments, an improved pet toy is configured for use with a pet treat having a body with a gap therein that communicates with a central opening in the pet treat. The pet toy includes a body having an exterior surface and a core portion that is radially asymmetric and a slot formed in the body about the core portion. The slot has the core portion as a base and includes a sidewall having a second surface feature configured to cooperate with a first surface feature of the pet treat to promote retention of the pet treat in the slot. In some embodiments, one of the first and second surface features is a boss and the other is a recess. In some embodiments, the first and second surface features are engaged by rotating the pet treat within the slot with respect to the body of the pet toy.

In some embodiments, a pet treat is configured for use with a pet toy having a slot partially defined by a sidewall. The pet treat includes an edible body having a first side and an opposing second side. The body has a gap therein that communicates with a central opening in the body. A first surface feature is disposed on the body and configured to cooperate with a second surface feature of the sidewall of the slot of the pet toy to promote retention of the pet treat in the slot of the pet toy.

In some embodiments, a method of using a pet toy includes providing a pet treat including an edible body having a first side and an opposing second side. The body has a gap therein that communicates with a central opening in the body and further includes a first surface feature disposed on the body. The method additionally includes providing a pet toy configured for use with the pet treat. The pet toy includes a body having an exterior surface and a core portion that is radially asymmetric. A slot is formed in the body of the pet toy about the core portion. The slot has the core portion as a base and includes a sidewall having a second surface feature configured to cooperate with the first surface feature of the pet treat to promote retention of the pet treat in the slot. The method additionally includes inserting the pet treat in the slot such that the core portion is received through the gap into the central opening and engaging the first surface feature on the pet treat with the second surface feature on the pet toy.

While the present invention has been particularly shown as described with reference to one or more preferred embodiments, it will be understood by those skilled in the art that various changes in form and detail may be made therein without departing from the spirit and scope of the invention. For example, elements of the disclosed embodiments can be combined to form additional embodiments within the scope of the appended claims. The term "coupled" as used herein is defined to encompass embodiments employing a direct connection between coupled elements, as well as embodiments employing an indirect connection between coupled elements achieved using one or more intervening elements. In addition, the term "exemplary" is defined herein as meaning one example of a feature, not necessarily the best or preferred example. The terms "approximately," "substantially", and "about" are utilized herein to indicate ranges of values within 10% of the stated values.

What is claimed is:

1. A pet toy configured for use with a pet treat, wherein the pet treat has a body defined by a partial loop having two spaced-apart ends separated by a gap and having a central opening that communicates with the gap, and wherein the body of the pet treat has a first surface feature, the pet toy comprising:
   a body having an exterior surface and a core portion that is radially asymmetric; and
   a slot formed in the exterior surface of the body and about the core portion, wherein the slot has an opening that communicates with the exterior surface, has the core portion as a base, and includes a sidewall having a second surface feature configured to cooperate with the first surface feature of the pet treat to promote retention of the pet treat in the slot.

2. The pet toy of claim 1, wherein the second surface feature is a boss protruding from the sidewall into the slot.

3. The pet toy of claim 1, wherein the second surface feature is a recess formed in the sidewall.

4. The pet toy of claim 1, wherein the sidewall is substantially planar.

5. The pet toy of claim 4, wherein:
   the sidewall is a first sidewall; and
   the slot includes a second sidewall substantially parallel to the first sidewall.

6. The pet toy of claim 1, wherein the body has a hole formed through the core portion.

7. The pet toy of claim 1, wherein the second surface feature is positioned on the sidewall such that the pet treat must be radially displaced from an initial insertion position for the first surface feature to engage the second surface feature.

8. The pet toy of claim 1, wherein the body has a curved portion and the slot is formed in the curved portion of the body.

9. The pet toy of claim 1, wherein the sidewall includes multiple of the second surface features.

10. The pet toy of claim 1, wherein the body includes a handle portion.

11. A system including the pet toy of claim 1 and the pet treat.

12. The system of claim 11, wherein the body of the pet treat is loop-shaped.

13. The system of claim 12, wherein the body of the pet treat has a substantially circular exterior surface at a periphery of the pet treat.

14. The system of claim 11, wherein:
   the body of the pet treat has a first side and an opposing second side; and
   the first surface feature is disposed on the first side.

15. The system of claim 14, wherein the second side includes another of the first surface feature.

16. The system of claim 11, wherein the first surface feature is one of the following: a boss and a recess.

17. A pet toy configured for use with a pet treat, wherein the pet treat has a body defined by a partial loop having two spaced-apart ends separated by a gap and having a central opening that communicates with the gap, and wherein the body of the pet treat has a first surface feature, the pet toy comprising:
   a body having an exterior surface and a core portion that is radially asymmetric; and
   a slot formed in the exterior surface of the body and about the core portion, wherein the slot has an opening that communicates with the exterior surface, has the core portion as a base, and includes a sidewall having a second surface feature configured to cooperate with the first surface feature of the pet treat to promote retention of the pet treat in the slot;
   wherein the second surface feature is positioned on the sidewall such that the pet treat must be radially displaced from an initial insertion position for the first surface feature to engage the second surface feature.

18. The pet toy of claim 17, wherein the second surface feature is one of the following: a boss and a recess.

* * * * *